(12) United States Patent
Chiang et al.

(10) Patent No.: US 6,222,716 B1
(45) Date of Patent: *Apr. 24, 2001

(54) POWER LINE PROTECTION DEVICES AND METHODS FOR PROVIDING OVERLOAD PROTECTION TO MULTIPLE OUTPUTS

(76) Inventors: Justin Chiang, 50 St. James Pl., Piedmont, CA (US) 94611; Adrian I. Cogan, P.O. Box 522, San Carlos, CA (US) 94065; Paul Wiener, 2424 Via de los Milagros, Pleasanton, CA (US) 94566

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,004

(22) Filed: Mar. 29, 1999

(51) Int. Cl.$^7$ ...................................... H02H 5/04

(52) U.S. Cl. .................. 361/103; 361/93.2; 361/93.8; 361/94; 307/125

(58) Field of Search .................. 361/78, 79, 83, 361/93.1, 93.2, 93.8, 93.9, 94, 103; 307/112, 115, 116, 125, 126, 130, 131, 132 R, 132 T, 139, 140, 141; 712/220, 223; 340/540, 584, 588

(56) References Cited

U.S. PATENT DOCUMENTS

| | | | |
|---|---|---|---|
| 4,589,052 | 5/1986 | Dougherty | 361/94 |
| 4,882,502 | 11/1989 | Kobayashi | 307/247.1 |
| 5,003,426 | 3/1991 | Yeh et al. | 361/59 |
| 5,111,123 | 5/1992 | Hach et al. | 318/434 |
| 5,168,414 | 12/1992 | Horstmann | 361/59 |
| 5,297,014 | 3/1994 | Saito et al. | 363/21 |
| 5,436,821 | 7/1995 | Inoue | 363/59 |
| 5,642,072 | 6/1997 | Miyamoto et al. | 327/535 |
| 5,737,169 * | 4/1998 | Sellers | 361/98 |
| 5,894,394 | 4/1999 | Baba et al. | 361/87 |
| 5,900,683 * | 5/1999 | Rinehart et al. | 307/129 |
| 5,969,981 | 10/1999 | Kono | 365/145 |
| 6,000,042 * | 12/1999 | Henrie | 714/40 |

FOREIGN PATENT DOCUMENTS

| | | |
|---|---|---|
| 92 06 466 U | 6/1993 | (DE) . |
| 0 717 341 | 6/1996 | (EP) . |
| 2 321 141 | 7/1998 | (GB) . |

OTHER PUBLICATIONS

Micrel MIC2526 "Dual USB High–Side Power Switch Advance Information" Dec., 1998.
Texas Instruments "TPS2042, TPS2052 Dual Power–Distribution Switch" Aug. 1998.
Analog Integrations Corporation, "Dual USB High–Side Power Switch" Spec No. DS–1526–Ps (No Date Avail).
European International Search Report for International Application No. PCT/US00/07282 dated Jul. 17, 2000.

(List continued on next page.)

Primary Examiner—Michael J. Sherry
Assistant Examiner—Kim Huynh

(57) ABSTRACT

A method and apparatus for providing a more reliable protection device and an improved PIC power integrated switch. Accordingly, the over-temperature status of the switch as well as the overcurrent status of each of a plurality of ports of the switch are detected. If there is over-temperature, ports with the overcurrent status are identified as a potential cause. These ports are then switched off. After a predetermined waiting time period during which the switch temperature is expected to decrease, the over-temperature status of the switch is again checked. If the over-temperature disappears, then the ports with non-overcurrent status remain on. However, if the over-temperature persists, then all of the ports are turned off. The improved PIC switch thus increases the dynamic operation range of the conventional PIC switch, while ensuring normal operations.

26 Claims, 5 Drawing Sheets

OTHER PUBLICATIONS

European International Search Report for International Application No. PCT/US00/07217 dated Jul. 17, 2000.

European International Search Report for International Application No. PCT/US00/07219 dated Jul. 17, 2000.

Patent Abstracts of Japan, vol. 1998, No. 04 (Mar. 31, 1998) & JP 09 331625A (Yazaki Corporation), Dec. 22, 1997, abstract. (Counterpart of U.S. 5,984,394, listed above).

Patent Abstracts of Japan, vol. 015, No. 161 (E–1060, Apr. 23, 1991) & JP 03 034453A (NEC Corporation), Feb. 14, 1991, abstract.

Patent Abstracts of Japan, vol. 018, No. 661 (E–1644, Dec. 14, 1994) & JP 06 260884A (Mitsubishi Electric Corporation), Sep. 16, 1994, abstract.

* cited by examiner

| PATH# | OT | OC1 | OC2 | $V_{FG1}$ | SW1 | $V_{FG2}$ | SW2 |
|---|---|---|---|---|---|---|---|
| 1 | yes | no | no | yes | off | yes | off |
| 2 | yes | yes | no | yes | off | no | on |
| 3 | yes | no | yes | no | on | yes | off |
| 4 | yes | yes | yes | yes | off | yes | off |
| 5 | no | yes | no | yes | current limit | no | on |
| 6 | no | no | yes | no | on | yes | current limit |
| 7 | no | yes | yes | yes | current limit | yes | current limit |
| 8 | no | no | no | no | on | no | on |

POWER LINE PROTECTION DEVICES AND METHODS FOR PROVIDING OVERLOAD PROTECTION TO MULTIPLE OUTPUTS

CROSS-REFERENCE TO RELATED APPLICATIONS

This application is related to two commonly assigned applications being filed on the same day as this application, by the same inventors, entitled "Power Line Protection Devices and Methods Capable of Preventing False Fault Reporting" and "Integrated Switch Devices with Enhanced Functionalities," respectively, U.S. application Ser. Nos. 09/280,267 and 09/290,272, respectively. The disclosures of these two applications are hereby incorporated by reference.

BACKGROUND OF THE INVENTION

The invention relates generally to protection devices, and more particularly to those used in computer power bus lines, which power downstream electronic components and power management circuits.

Modern technologies have allowed more and more computers to be connected to one another by way of networking. Each computer may have numerous peripheral devices connected to it. Peripheral devices include not only the traditional ones such as a keyboard, a mouse, etc., but also those with new applications, e.g., a digital camera. In a typical network system, a hub is connected to a number of nodes, each of which may be connected to a number of sub-nodes. Each node or sub-node may be a computer or a peripheral device. Each sub-node may be connected to additional sub-sub-nodes, and so on. In such a network system, power is typically distributed to the various nodes and sub-nodes, etc. One example of such a network environment relates to the recent USB (Universal Serial Bus) standards, e.g., USB-IF, USB Specification, Rev. 1.1, 1998.

In such a network system, each network node is continuously monitored. Normal operation as well as fault conditions (e.g., overcurrent, over-temperature, under-voltage, etc.) are constantly reported to a control circuit. When a fault condition, e.g., overcurrent condition, occurs at one node or sub-node, it is important that any point of failure not affect the operation of the remaining portions of the network system. In other words, the failure must be localized and isolated in order to achieve high performance in a network system.

Various power bus line protection devices have been proposed. Most conventional protection devices include a power integrated circuit (PIC) switch that uses overload detection circuitry to continuously monitor current flowing to all ports controlled by the switch as well as the temperature of the switch. If the preset current limit of a port is exceeded, the "offending" port is turned off. If the preset temperature limit of the switch is reached as a result of an overcurrent status of a port, for example, all ports are usually turned off without regard to the non-overcurrent status of any of the other ports. This protection scheme has the potential to significantly reduce the dynamic operation range for the switch controlling multiple ports, because if only one port is overloaded, which causes the over-temperature status of the switch, all other ports are turned off nonetheless.

Another proposed protection scheme uses a temperature range for the switch as a reference guide for switching off the ports. If the temperature of the switch reaches the lower limit of the range, an overload detection circuitry monitors the temperature of the switch more closely, but no action is taken, in anticipation of a decrease in the temperature. If the temperature continues to rise and eventually reaches the higher limit of the temperature range, the port is switched off. Such a scheme, however, cannot reliably protect the switch against overload, because the temperature range creates an uncertain overload region. If the temperature of the switch stays near the high end of the range for a relatively long period of time, without ever reaching the higher limit of the range, there is a high probability that the switch will be permanently damaged.

Therefore, there is a need to provide a more reliable protection device and an improved PIC switch that increases the dynamic operation range of the conventional PIC switch, while ensuring normal operations.

SUMMARY OF THE INVENTION

The present invention provides a more reliable protection device and an improved PIC switch that increases the dynamic operation range of the conventional PIC switch, while ensuring normal operations.

According to one embodiment of the present invention, a switch device is provided and comprises first and second ports; a fault protection logic for detecting over-temperature status of the device and overcurrent status of each of the first and second two ports and for generating control signals based on the over-temperature status and the overcurrent status of each of the two ports; and a control logic, responsive to the control signals, for switching on and off the two ports. In this embodiment, if there is an over-temperature and there is an overcurrent at the first port, but there is no overcurrent at the second port, the protection logic controls the control logic to switch off the first port and after a predetermined time period, the protection logic re-checks the over-temperature status of the device and controls the control logic to switch off the second port if the over-temperature persists. The predetermined time period is preferably about 300 ms.

According to one aspect of the embodiment of the invention, if there is an over-temperature and the overcurrent status at each of the ports is the same, the protection logic controls the control logic to switch off both of the ports.

According to another aspect of the embodiment of the invention, the protection logic includes a current limit circuit and if there is no over-temperature, but there is overcurrent status at both of the ports, the current limit circuit causes the control logic to limit current flowing through each of the ports to a predetermined value. If there is no over-temperature and there is no overcurrent at the first port, but there is overcurrent at the second port, the current limit circuit causes the control logic to limit current flowing through the second port to the predetermined value. The predetermined value is preferably about 500 mA.

According to a further aspect of the embodiment of the invention, the control logic includes a flag control circuit for setting a flag for each of the ports if such port is switched off and for setting a flag for each of the ports if current is limited at such port.

According to another embodiment of the invention, a method for protecting a switch device having first and second ports is provided. The method comprises the steps of: (a) detecting an over-temperature status of the device; (b) detecting an overcurrent status of each of the first and second ports; (c) if there is over-temperature and there is overcurrent at first port, but there is no overcurrent at the second port, switching off the first port and waiting for a predetermined time period; (d) after waiting for the predetermined time period, re-checking the over-temperature status of the device; and (e) if, after waiting for the predetermined time period, the over-temperature persists, switching off the second port. The predetermined time period is preferably about 300 ms.

According to the method embodiment of the invention, if there is an over-temperature and the overcurrent status at each of the ports is the same, both of the ports are switched off. If there is no over-temperature, but there is overcurrent status at both of the ports, the current flowing through each of the ports is limited to a predetermined value. If there is no over-temperature and there is no overcurrent at the first port, but there is overcurrent at the second port, the current flowing through the second port is limited to a predetermined value. The predetermined value is preferably about 500 mA.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE PREFERRED EMBODIMENTS

Figure 1:
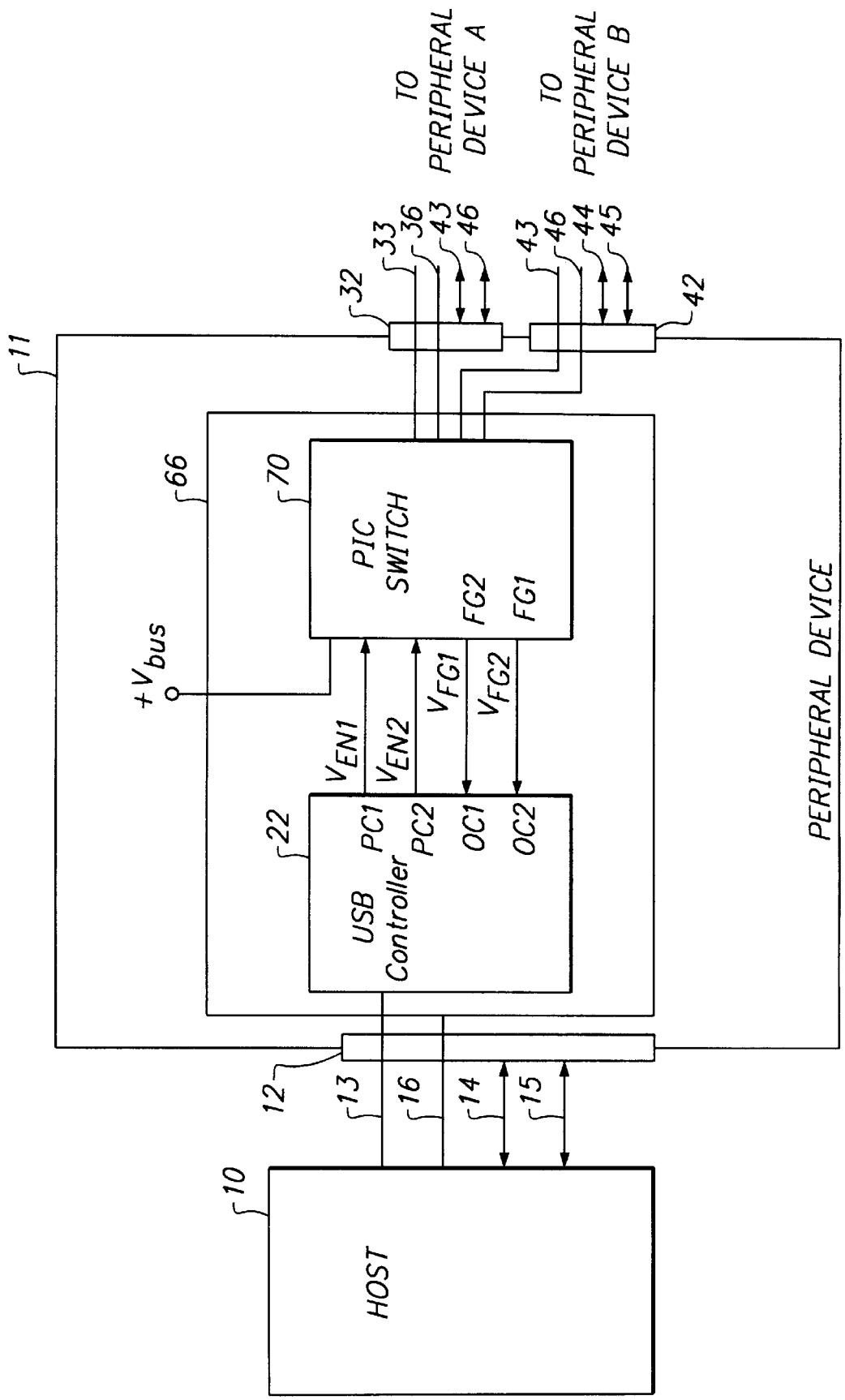
FIG. 1 shows a functional block diagram illustrating an application of a power management and protection device according to an embodiment of the present invention.

FIG. 1 shows a functional block diagram illustrating an application of a power management and protection device 66 in a personal computer environment, according to an embodiment of the present invention. In FIG. 1, a host 10 communicates with a peripheral device 11 via a USB port 12. Peripheral device 11 communicates with other peripheral devices A and B (not shown) via USB ports 32 and 42, respectively. USB port 12 includes a power line 13, two data lines 14 and 15, and a return line 16. Similarly, USB port 32 includes a power line 33, two data lines 34 and 35, and a return line 36; USB port 42 includes a power line 43, two data lines 44 and 45, and a return line 46. Peripheral device 11 includes a power management and protection device 66, which includes a USB controller 22 and a power integrated circuit (PIC) switch 70. Controller 22 may be a TUSB 2040 or TUSB 2070 device which is commercially available from Texas Instruments of Dallas, Tex. PIC switch 70 controls power supplied to USB ports 32 and 42 via power lines 33 and 43, respectively. PIC switch 70 will be described in more detail later with reference to FIGS. 2 and 3.

Host 10 periodically checks peripheral devices 11 and other connected peripheral devices A and B to determine their present status, e.g., whether there is a data request, a fault condition report, etc. Under normal conditions in which no overcurrent is present at either port and PIC switch 70 operates at normal operating temperature, controller 22 sends active enable signals $V_{EN1}$ and $V_{EN2}$ to PIC switch 70 for controlling power supply to ports 32 and 42, respectively. Under the normal conditions and upon receiving the enable signals by PIC switch 70, power is supplied to ports 32 and 42 via power lines 33 and 43, respectively. When a fault condition, such as an overcurrent, occurs at one of the ports, PIC switch 70 sends a fault flag signal, $V_{FG1}$ or $V_{FG2}$, to controller 22, which then informs host 10 of the fault condition. Depending on the over-temperature status of PIC switch 70 and the overcurrent status of the other port, the PIC switch will take appropriate actions with respect to the port having the overcurrent status. The operation details of PIC switch 70 will be described later in connection with FIG. 4.

Figure 2:
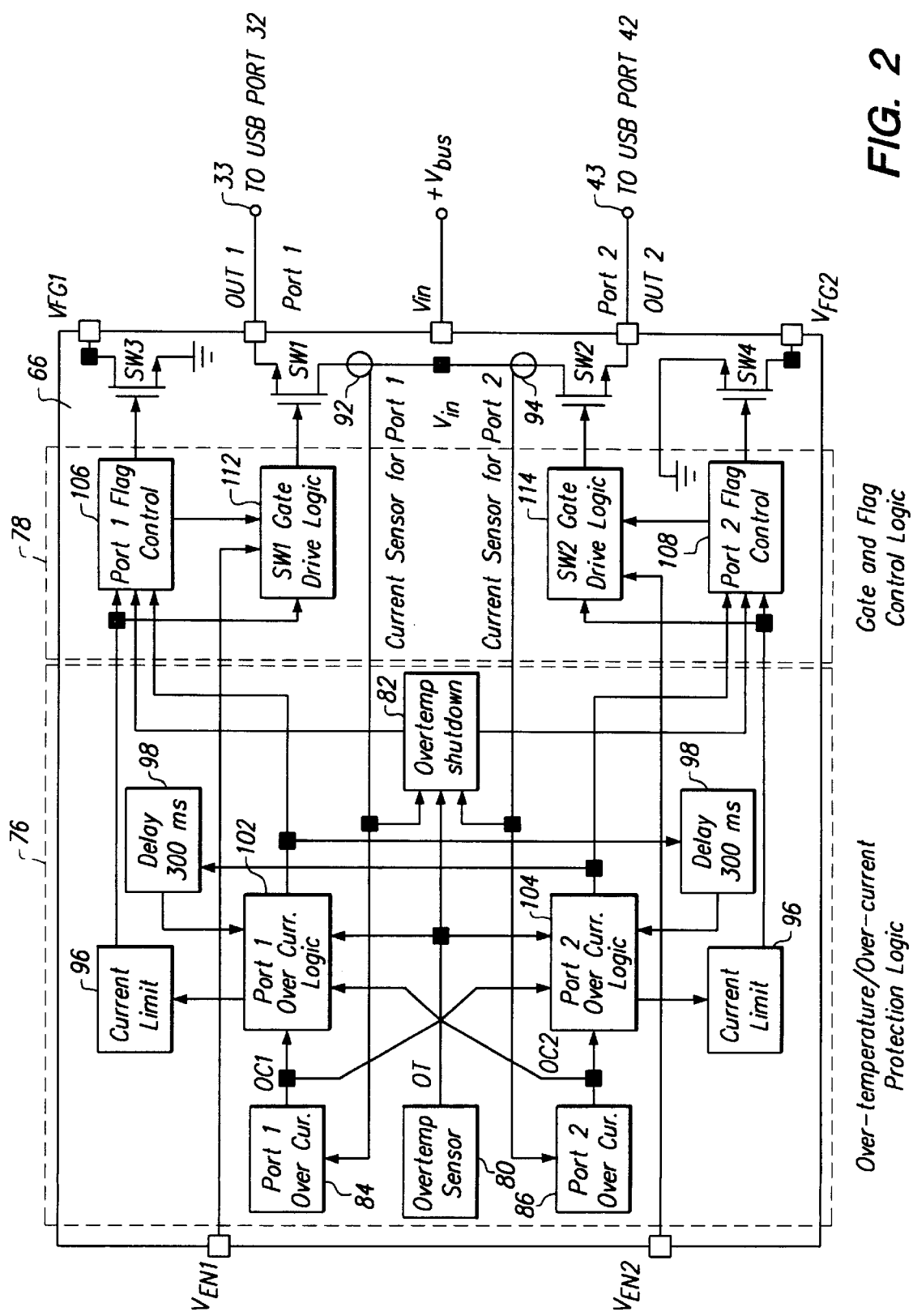
FIG. 2 shows an exemplary PIC switch according to an embodiment of the present invention.

FIG. 2 shows an exemplary embodiment of PIC switch 66, which has ports 1 and 2 for connecting to USB ports 32 and 42 (shown in FIG. 1), respectively. PIC switch 66 comprises an over-temperature/overcurrent (OT/OC) logic 76, a gate and flag control logic 78, and a plurality of switches SW1 to SW4, with SW1 for supplying power for port 1, SW2 for supplying power for port 2, SW3 for setting a flag signal VFGI for port 1, and SW4 for setting a flag signal VFG2 for port 2.

In PIC switch 66, an over-temperature sensor 80 detects whether over20 temperature is present and if so, it will output an OT signal to indicate an OT status of the switch. Upon receiving an OT signal, over-temperature shutdown circuit 82 outputs a control signal to port 1 flag control circuit 106.

Current sensor 92 detects the current flowing via the Vin terminal of port 1 and reports to port 1 overcurrent circuit 84, which detects whether there is overcurrent at port 1. Upon detecting overcurrent, port 1 overcurrent circuit 84 outputs an OC1 signal to indicate an overcurrent status of port 1. Similarly, current sensor 94 detects the current flowing via the Vin terminal of port 2 and reports to port 2 overcurrent circuit 86, which detects whether there is overcurrent at port 2. Upon detecting overcurrent, port 2 overcurrent circuit 86 outputs an OC2 signal to indicate an overcurrent status of port 2. In FIG. 2, each delay circuit 98 provides a predetermined time delay, e.g., 300 ms, in the case there is over-temperature, but only one port has an overcurrent status.

Port 1 overcurrent logic 102 receives OT, OC1 and OC2 signals and outputs control signals to current limit circuit 96 and port 1 control circuit 106. Upon receiving a control signal from port 1 overcurrent logic 102, current limit circuit 96 provides a current limit signal to port 1 flag control circuit 106 and SW1 gate drive logic 112 for limiting the current flowing via the Vin terminal of port 1.

Port 1 flag control circuit 106 receives input control signals from over-temperature shutdown circuit 82, port 1 overcurrent logic 102 and current limit circuit 96. Based on the input control signals, control circuit 106 outputs a gate control signal for controlling the setting of a flag signal $V_{FG1}$ for port 1, via switch SW3. Control circuit 106 also generates a SW1 turn-off signal to a SW1 gate drive logic 112 in accordance with the input control signals. SW1 gate drive logic 112 can be activated by enable signal $V_{EN1}$ to limit the current flowing via the Vin terminal of port 1 or to switch off the output power at port 1, depending on the input control signals received.

Port 2 overcurrent logic 104 receives OT, OC1 and OC2 signals and outputs control signals to current limit circuit 96 and port 2 control circuit 108. Upon receiving a control signal from port 2 overcurrent logic 104, current limit circuit 96 provides a current limit signal to port 2 flag control circuit 108 and SW2 gate drive logic 114 for limiting the current flowing via the Vin terminal of port 2.

Port 2 flag control circuit 108 receives input control signals from over-temperature shutdown circuit 82, port 2 overcurrent logic 104 and current limit circuit 96. Based on the input control signals, control circuit 108 outputs a gate control signal for controlling the setting of a flag signal $V_{FG2}$ for port 2, via switch SW2. Control circuit 108 also generates a SW2 turn-off signal to a SW2 gate drive logic 114 in accordance with the input control signals. SW2 gate drive logic 114 can be activated by enable signal $V_{EN2}$ to limit the current flowing via the Vin terminal of port 2 or to switch off the output power at port 2, depending on the control signals received.

Figure 3A:
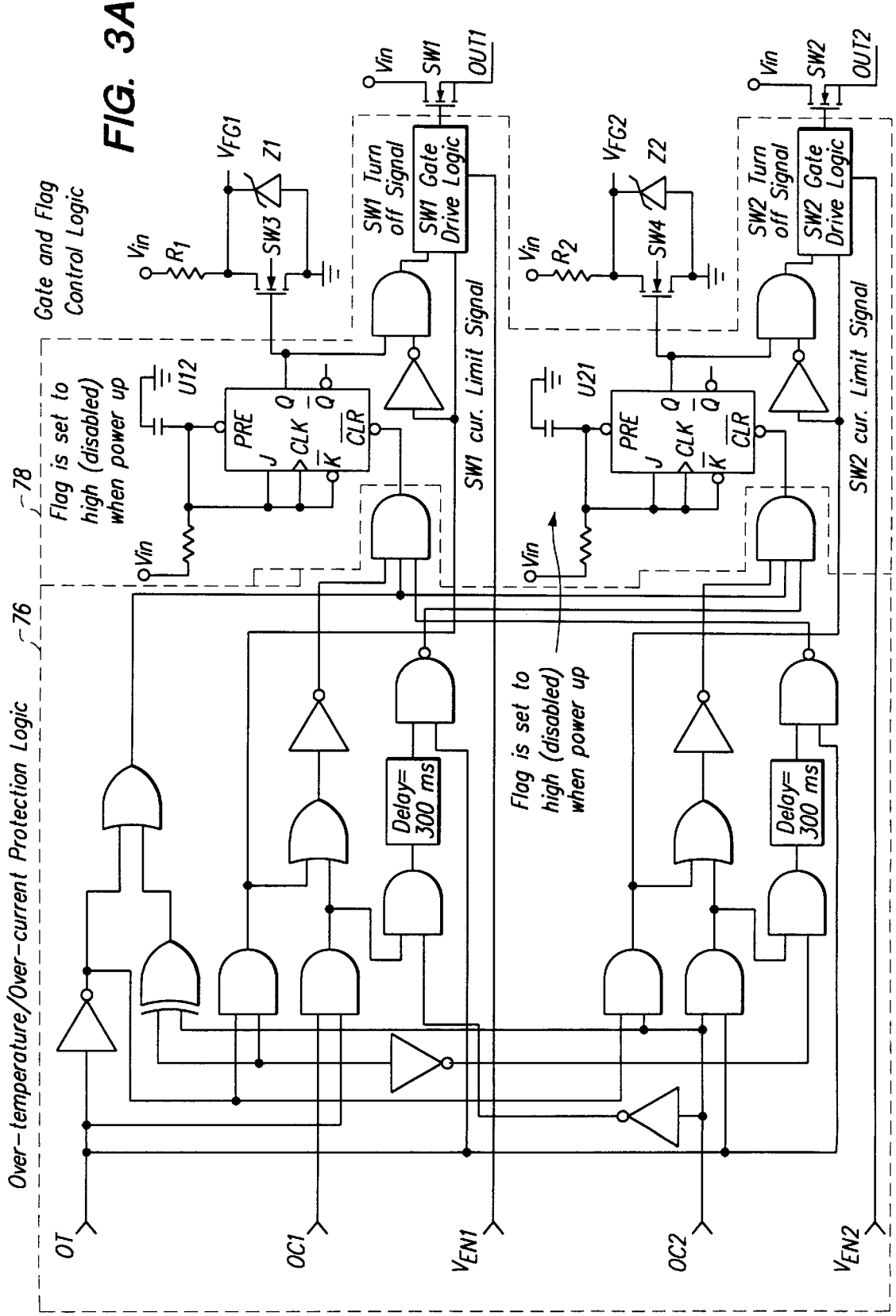
FIG. 3A shows a logic circuit diagram illustrating an exemplary implementation of the PIC switch in FIG. 2.

FIG. 3A shows a logic circuit diagram illustrating an exemplary implementation of PIC switch 66 in FIG. 2. It should be noted that in FIG. 3A, pull-up resistors R1 and R2 and zener diodes Z1 and Z2 (which are not illustrated in FIG. 2 for simplicity) may be either internal or external to the PIC switch. In the case in which they are internal components of the PIC switch, each of them may be disconnected, at the option of the customer, by way of masking during fabrication to accommodate circuit boards with any pre-mounted external pull-up resistors or zener diodes.

Figures 3B, 5:
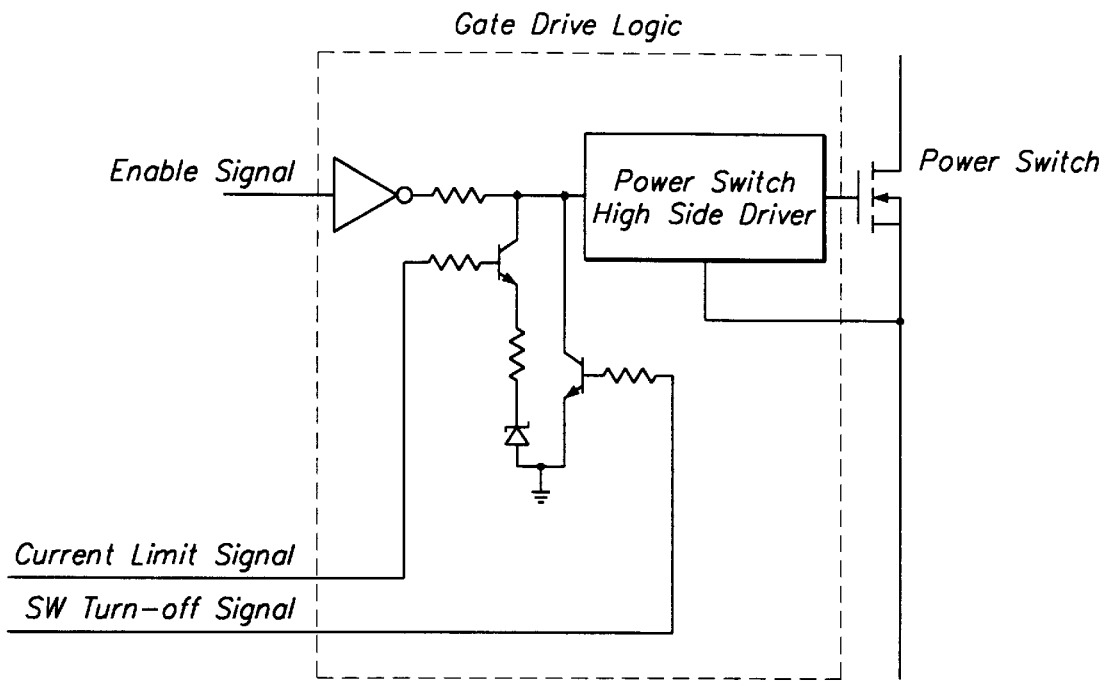
FIG. 3B illustrates an exemplary implementation of the gate drive logic in FIG. 3A.
FIG. 5 shows a table summarizing the operation results obtained from implementing the flow chart in FIG. 4.

FIG. 3B illustrates an exemplary implementation of gate drive logic 112 and 114 in FIG. 3A. In FIG. 3B, the power switch high side driver is a standard circuit, such as UC1724 commercially from Unitrode, or IR2110 commercially available from International Rectifier.

The circuits of FIGS. 2 and 3A operate in accordance with a flow chart diagram in FIG. 4, which is now described with reference to FIGS. 2 and 3.

Figure 4:
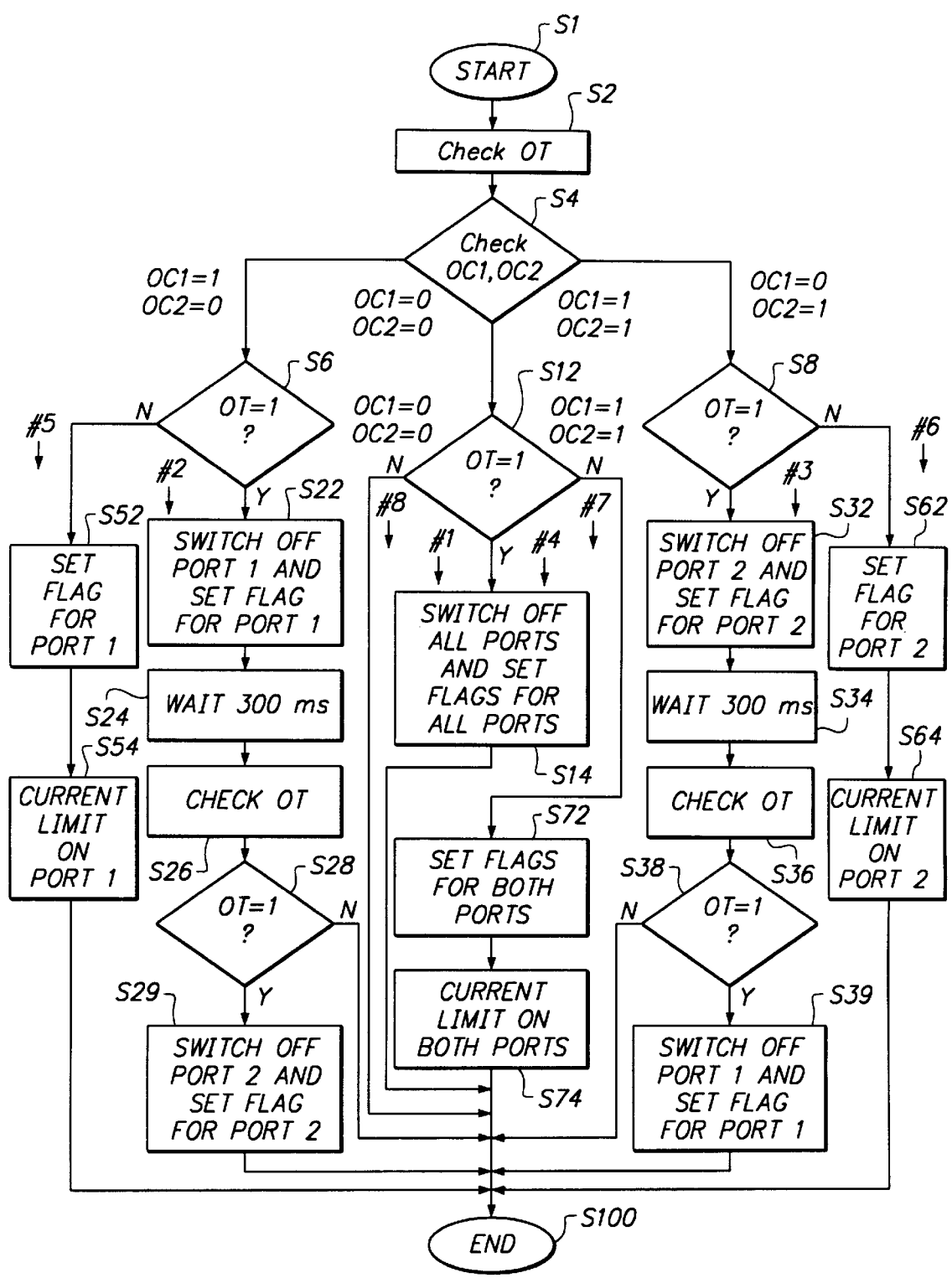
FIG. 4 shows a flow chart diagram illustrating the operation of the IC switch according to an embodiment of the present invention.

As illustrated in FIG. 4, at step S1, power is up. Over-temperature sensor 80 checks the over-temperature (OT) status of the PIC switch at step S2. Port 1 overcurrent logic 102 and port 2 overcurrent logic 104 respectively check the overcurrent status of port 1 (OC1) and of port 2 (OC2) of PIC switch 66, at step S4. Depending on the states of OC1, OC2 and OT, different paths will be followed with different results.

Assuming both OC1 and OC2 are both false at step S4, and OT is false at step S12, path #8 is followed. Thus, no action will be taken and all ports remain in the on state. If, however, OT is true at step S12 with both OC1 and OC2 being false, path #1 is followed. At step 14, SW1 and SW2 gate drive logic 112 and 114 switch off ports 1 and 2, respectively, to protect the PIC switch against overheating. Furthermore, port 1 and port 2 flag control circuits 106 and 108 set flags $V_{FG1}$ and $V_{FG2}$ for ports 1 and 2, respectively, to indicate the overcurrent status at both ports. In this case, the over-temperature is apparently not caused by the over-current status of any particular port. Therefore, the PIC switch must be turned off entirely to protect against overheating.

If, at step S4, both OC1 and OC2 are true, and at step S12, OT is true, path #4 is followed with the same results as those derived from following path #1. That is, all ports are switched off and the flags are set for all ports to indicate the overcurrent status at the ports. On the other hand, if, at step S12, OT is false with both OC1 and OC2 being true, port 1 and port 2 flag control circuits 106 and 108 set the flags for ports 1 and 2, respectively, at step S72. At step S74, SW1 gate drive logic 112 and SW2 gate drive logic 114 are activated to limit the current flowing via the Vin terminals of ports 1 and 2, respectively, to a predetermined value, e.g., 500 mA. According to a preferred embodiment of the present invention, SW1 and SW2 are made of MOSFETs with small on-resistances.

If, at step S4, OC1 is true, but OC2 is false, and at step S6, OT is false, then path #5 is followed. At step S52, port 1 flag control circuit 106 sets a flag $V_{FG1}$ for port 1 to indicate an overcurrent status. At step S54, SW1 gate drive logic 112 is activated to limit the current flowing via the Vin terminal of port 1 to a predetermined value, e.g., 500 mA, to prevent potential overheating of the PIC switch. On the other hand, if, at step S6, OT is true, path #2 is followed. At step S22, SW1 gate drive logic 112 switches off port 1 and port 1 flag control circuit 106 sets a flag $V_{FG1}$ for port 1 to indicate the overcurrent status. In this case, the over-temperature may be caused by the overcurrent at port 1. Therefore, it is desirable to turn off only the "offending" port 1, while leaving port 2 with non-overcurrent status on unless over-temperature persists. Thus, there is a waiting period of 300 ms, at step S24, provided by a delay circuit 98. After this waiting period, OT is checked again at step S26. At step S28, if OT is false, no action will be taken with respect to port 2 and port 2 remains on since there is no danger of overheating the PIC switch. If, however, OT persists at step S28, SW2 gate drive logic 114 switches off port 2 and port 2 flag control circuit 108 sets a flag $V_{FG2}$ for port 2 at step S29. Therefore, the PIC switch is entirely turned off.

In the flow chart diagram of FIG. 4, if, at step S4, OC1 is false, but OC2 is true, and at step S8, OT is true, path #3 is followed, which is similar to path #2. At step S32, SW2 gate drive logic 114 switches off port 2 and port 2 flag control circuit 108 sets a flag $V_{FG2}$ for port 2 to indicate the overcurrent status. In this case again, the over-temperature may be caused by the overcurrent at port 2. Therefore, it is desirable to turn off only the "offending" port 2, while leaving port 2 with non-overcurrent status on unless over-temperature persists. Thus, there is a similar waiting period of 300 ms, at step S34, provided by a delay circuit 98. After this waiting period, OT is checked again at step S36. At step S38, if OT is false, no action will be taken with respect to port 1 and port 1 remains on because there is no danger of overheating the PIC switch. If, however, OT persists at step S38, SW1 gate drive logic 112 switches off port 1 and port 1 flag control circuit 106 sets a flag VFGI for port 1 at step S39. The PIC switch is thus entirely turned off.

If, at step S4, OC1 is false, but OC2 is true, and at step S8, OT is false, path #6 is followed, which is similar to path #5. At step S62, port 2 flag control circuit 108 sets a flag $V_{FG2}$ for port 2 to indicate an overcurrent status. At step S64, SW2 gate drive logic 114 is activated to limit the current flowing via the Vin terminal of port 2 to a predetermined value, e.g., 500 mA, to prevent potential overheating of the PIC switch.

After step 100 is reached, any further changes in the over-temperature status of the PIC switch and the overcurrent status at any of the ports will be reported by the PIC switch to controller which then re-enables the PIC switch to perform the steps in the flow chart of FIG. 4.

The flow chart in FIG. 4 can be easily adapted for use with a PIC switch with three or more ports. In such a case, when there is an over-temperature and at least one of the multiple ports has a non-overcurrent status, the ports with overcurrent status are switched off, while leaving the port with non-overcurrent status on, unless the over-temperature persists. After a predetermined waiting period, if the over-temperature persists, the entire PIC switch is turned off. Otherwise, the port with non-overcurrent status remains on.

In other situations, the PIC switch will operate in a manner similar to that illustrated by the flow chart of FIG. 4. In this way, the dynamic operating range of the PIC switch is substantially increased. The flow chart in FIG. 4 can also be implemented in software.

FIG. 5 shows a table summarizing the operation results obtained from following the different paths of the flow chart diagram in FIG. 4.

Thus, by using the present invention, the overall operation efficiency of the network system can be achieved, while keeping all the circuit components and the peripheral ports in their normal operating ranges.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications and variations as may fall within the spirit and scope of the appended claims.

What is claimed is:

1. A switch device, comprising:

first and second ports;

a fault protection logic for a detecting over-temperature status of the device and an overcurrent status of each of said first and second two ports and for generating control signals based on the over-temperature status and the overcurrent status of each of said ports;

a control logic, responsive to the control signals, for switching on and off said two ports;

wherein if there is over-temperature and there is overcurrent at said first port, but there is no overcurrent at said second port, said protection logic controls said control logic to switch off said first port and after a predetermined time period, said protection logic re-checking the over-temperature status of the device and controlling said control logic to switch off said second port if the over-temperature persists.

2. The device of claim 1 wherein the predetermined time period is about 300 ms.

3. The device of claim 1 wherein if there is over-temperature and the overcurrent status at each of the ports is the same, said protection logic controls said control logic to switch off both of the ports.

4. The device of claim 1 wherein said protection logic includes a current limit circuit and wherein if there is no over-temperature, but there is overcurrent status at both of the ports, said current limit circuit causes said control logic to limit current flowing through each of the ports to a predetermined value.

5. The device of claim 4 wherein if there is no over-temperature and there is no overcurrent at the first port, but there is overcurrent at the second port, said current limit circuit causes said control logic to limit current flowing through the second port to the predetermined value.

6. The device of claim 5 wherein the predetermined value is about 500 mA.

7. The device of claim 5 wherein said control logic includes a flag control circuit for setting a flag for each of said ports if such port is switched off.

8. The device of claim 5 wherein said control logic includes a flag control circuit for setting a flag for each of said ports if current is limited at such port.

9. A method for protecting a switch device having first and second ports, comprising the steps of:

(a) detecting an over-temperature status of the device;

(b) detecting an overcurrent status of each of the first and second ports;

(c) if there is over-temperature and there is overcurrent at first port, but there is no overcurrent at the second port, switching off the first port and waiting for a predetermined time period;

(d) after waiting for the predetermined time period, re-checking the over-temperature status of the device; and (e) if, after waiting for the predetermined time period, the over-temperature persists, switching off the second port.

10. The method of claim 9 wherein the predetermined time period is about 300 ms.

11. The method of claim 9 wherein step (c) further comprises the step of setting a flag for said first port.

12. The method of claim 9, further comprising the steps of:

(f) if there is over-temperature and the overcurrent status at each of the ports is the same, switching off both of the ports.

13. The method of claim 12 wherein step (f) further comprises the step of setting a flag for each of the ports.

14. The method of claim 9, further comprising the steps of:

(f) if there is no over-temperature, but there is overcurrent status at both of the ports, limiting current flowing through each of the ports to a predetermined value.

15. The method of claim 14 wherein the predetermined value is about 500 mA.

16. The method of claim 14 wherein step (f) further comprises the step of setting a flag for each of the ports.

17. The method of claim 9, further comprising the steps of:

(f) if there is no over-temperature and there is no overcurrent at the first port, but there is overcurrent at the second port, limiting current flowing through the second port to a predetermined value.

18. The method of claim 17 wherein the predetermined value is about 500 mA.

19. The method of claim 17 wherein step (f) further comprises the step of setting a flag for the second port.

20. A method for protecting a switch device having first and second ports, comprising the steps of:

(a) detecting an over-temperature status of the device;

(b) detecting an overcurrent status of each of the first and second ports;

(c) if there is over-temperature and there is overcurrent at first port, but there is no overcurrent at the second port, switching off the first port and waiting for a predetermined time period;

(d) after waiting for the predetermined time period, re-checking the over-temperature status of the device;

(e) if, after waiting for the predetermined time period, the over-temperature persists, switching off the second port;

(f) if there is over-temperature and the overcurrent status at each of the ports is the same, switching off both of the ports;

(g) if there is no over-temperature, but there is overcurrent status at both of the ports, limiting current flowing through each of the ports to a predetermined value; and (h) if there is no over-temperature and there is no overcurrent at the first port, but there is overcurrent at the second port, limiting current flowing through the second port to the predetermined value.

21. The method of claim 20 wherein the predetermined time period is about 300 ms and the predetermined value is about 500 mA.

22. The method of claim 20 wherein step (c) further comprises the step of setting a flag for the first port.

23. The method of claim 20 wherein each of steps (f) and (g) further comprises the step of setting a flag for each of the ports.

24. The method of claim 20 wherein step (h) further comprises the step of setting a flag for the second port.

25. A method for protecting a switch device having a plurality of ports, comprising the steps of:

(a) detecting an over-temperature status of the device;

(b) detecting an overcurrent status of each of the plurality of ports;

(c) if there is over-temperature and there is overcurrent at at least one of the ports, but there is no overcurrent at at least one of the ports, switching off any of the ports with the overcurrent status and waiting for a predetermined time period;

(d) after waiting for the predetermined time period, re-checking the over-temperature status of the device; and (e) if, after waiting for the predetermined time period, the over-temperature persists, switching off any of the ports with non-overcurrent status.

26. The method of claim 25 wherein the predetermined time period is about 300 ms.

* * * * *